Patented Aug. 25, 1953

2,650,224

UNITED STATES PATENT OFFICE 2,650,224

SALTS OF 7-IODO-8-HYDROXY-QUINOLINE-5-SULFONIC AND 7-HALOQUINOLINES CARRYING A DIALKYLAMINO-ALKYL-AMINO SUBSTITUENT IN THE 4-POSITION

Karl Koenig, Leverkusen-Bayerwerk, and Hans Andersag, Wuppertal-Elberfeld, Germany, assignors to Schenley Industries, Inc., New York, N. Y.

No Drawing. Application July 21, 1951, Serial No. 238,022. In Germany July 22, 1950

6 Claims. (Cl. 260—286)

This invention relates generally to novel organic chemical compounds useful as chemotherapeutic agents. In a more particular sense, it is concerned with certain novel organic chemical compounds that have powerful amoebicidal activity.

It is well known that 7-iodo-8-hydroxy-quinoline-5-sulfonic acid, Chiniofon U. S. P., is useful in the treatment of amoebic dysentery. The action of the drug is believed to be due to its direct action on the pathogenic microorganisms in the intestinal tract. The drug is ineffective however for control of parasites other than those present in the intestinal contents or on the surface of the intestinal mucosa, the parasites present in other parts of the body remaining unaffected.

One of the objects of the invention is to provide an effective amoebicidal agent which may be used to control amoebas and similar parasites not merely in the intestinal tract itself but additionally in other body tissues such as the liver.

In accordance with this invention there are provided certain novel amoebicidal organic chemical compounds which are capable of controlling amoebas and similar parasites irrespective of the location and including such parasites when located in the liver and neighboring tissues. New compounds of this invention are essentially salts of a 7-iodo-8-hydroxy-quinoline-5-sulfonic acid with a 7-halo quinoline having a 4-position substituent comprising a tertiary amino group. Suitable 4-amino groups substituents for compounds of this invention are those capable of conferring strong basic properties upon the compound, for example a diethylaminoisopentyl-amino group, a 4-hydroxy-3-diethylaminomethyl-phenyl-group or a diethylamino-n-propyl-amino group.

These new products of this invention are sparingly water soluble crystalline powders which upon analysis are found to be the combination of two moles of the quinoline sulfonic acid moiety per mole of the 4-amino-quinoline moiety. The two moieties, which are derived from individually effective amoebicides, when combined have a toxicity smaller than predicted upon knowledge of the toxicity of the components. In addition to being specific amoebicides for the treatment of amoebic dysentery, the compounds of this invention find particular application in the treatment of amoebic abscesses in non-intestinal sites such as the liver. The compounds are also useful in treatment of various tropical diseases caused by pathogenic microorganisms other than *Entamoeba histolytica.*

The compounds of this invention can be readily prepared by neutralizing a 7-halo-4-amino-quinoline having a substituent at the amino group capable of imparting strongly basic properties to the compound, with a 7-halo-8-hydroxy-quinoline-5-sulfonic acid, preferably in a suitable reaction medium such as an organic solvent or mixture of organic solvents. The same products may be obtained also by reacting a water-soluble salt of a 7-halo-4-amino-quinoline having substituents at the amino group imparting strong basic qualities to the product, with a water-soluble salt of 7-iodo-8-hydroxy-quinoline-5-sulfonic acid.

As examples of particularly suitable 7-halogen-4-amino-quinolines for use in preparing the compounds of this invention may be mentioned: 7-chloro-4-diethylamino-isopentylamino-quinoline, 7-iodo-3-methyl-4-diethylaminoisopentylamino-quinoline, 7-chloro-4-(4'-hydroxy-3'-diethylaminomethylphenyl)-amino-quinoline, 7-chloro-3-methyl-4-diethylaminoisopentyl-amino-quinoline and 7-chloro-3-methyl-4-diethylamino-n-propylamino-quinoline.

To facilitate a better understanding of the subject matter of the application and the principles of the invention in specific instances, two examples herewith follow which we have provided by way of illustration of the invention and are not to be construed in any way as a limitation thereof.

*Example 1*

A solution of about 70 grams of 7-iodo-8-hydroxy-quinoline-5-sulfonic acid and 16.5 grams of sodium bicarbonate in 5 liters of water are added, dropwise, at 60° C. to a solution of 52 grams of 7-chloro-4-diethylamino-isopentyl-amino-quinoline-diphosphate in 7 liters of water. On slowly cooling, a thick crystal paste precipitates, which is removed, washed with water and dried in vacuo to yield a white powder melting at 105–106° C. This compound is the salt of 7-chloro-4-diethylamino-isopentylamino-quinoline and 2 moles of 7-iodo-8-hydroxy-quinoline-5-sulfonic acid.

*Example 2*

70 grams of approximately 7-iodo-8-hydroxy-quinoline-5-sulfonic acid are introduced at 50° C. into a solution of 32 grams of 7-chloro-4-diethyl-aminoisopentylamino-quinoline in 700 cc. of acetone and 300 cc. of water are simultaneously added dropwise. After the reactants have been dissolved, the solution is mixed with some animal charcoal, filtered while hot and then it is cooled. The 7-iodo-8-hydroxy-quinoline-5-sulfonic acid salt of 7-chloro-4-diethylaminoisopentylamino-quinoline precipitates as crystals and is found to possess substantially the same properties as the compound described in Example 1.

Having thus described the subject matter of this invention, what it is desired to secure by Letters Patent is:

1. As a novel chemotherapeutical agent, the substantially neutral salt resulting from the combination of essentially two molal proportions of 7-iodo-8-hydroxy-quinoline-5-sulfonic acid with one molal proportion of a strongly basic compound chosen from the group consisting of 7 - chloro - 4 - diethylamino - iso - pentylamino - quinoline, 7 - iodo - 3 - methyl - 4 - diethylamino - iso - pentylamino - quinoline, 7 - chloro - 4 - (4' - hydroxy - 3' - diethylaminomethyl - phenyl) - amino - quinoline, 7 - chloro - 3 - methyl - 4 - diethylamino - iso - pentylamino - quinoline and 7 - chloro - 3 - methyl - 4 - diethylamino - n - propylamino - quinoline.

2. A chemotherapeutical agent as defined in claim 1 wherein the strongly basic compound is 7 - chloro - 4 - diethylamino - iso - pentylamino - quinoline.

3. A chemotherapeutical agent as defined in claim 1 wherein the strongly basic compound is 7 - iodo - 3 - methyl - 4 - diethylamino - iso - pentylamino-quinoline.

4. A chemotherapeutical agent as defined in claim 1 wherein the strongly basic compound is 7 - chloro - 4 - (4' - hydroxy - 3' - diethylamino-methyl-phenyl)-amino-quinoline.

5. A chemotherapeutical agent as defined in claim 1 wherein the strongly basic compound is 7 - chloro - 3 - methyl - 4 - diethylamino - iso - pentylamino-quinoline.

6. A chemotherapeutical agent as defined in claim 1 wherein the strongly basic compound is 7 - chloro - 3 - methyl - 4 - diethylamino - n - propylamino-quinoline.

KARL KOENIG.
HANS ANDERSAG.

No references cited.